US010254539B2

United States Patent
Ishiguro et al.

(10) Patent No.: US 10,254,539 B2
(45) Date of Patent: Apr. 9, 2019

(54) ON-VEHICLE DEVICE, METHOD OF CONTROLLING ON-VEHICLE DEVICE, AND COMPUTER-READABLE STORAGE MEDIUM

(71) Applicant: TOYOTA JIDOSHA KABUSHIKI KAISHA, Toyota-shi, Aichi-ken (JP)

(72) Inventors: Yoko Ishiguro, Toyota (JP); Hidenori Uno, Toyota (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 0 days.

(21) Appl. No.: 15/423,018

(22) Filed: Feb. 2, 2017

(65) Prior Publication Data
US 2017/0235135 A1 Aug. 17, 2017

(30) Foreign Application Priority Data
Feb. 17, 2016 (JP) ................. 2016-028269

(51) Int. Cl.
*G02B 27/01* (2006.01)
*B60K 35/00* (2006.01)
(Continued)

(52) U.S. Cl.
CPC .............. *G02B 27/01* (2013.01); *B60K 35/00* (2013.01); *G02B 27/0093* (2013.01);
(Continued)

(58) Field of Classification Search
CPC ...... G02B 2027/014; G02B 2027/0141; G02B 2027/0159; G02B 2027/0181;
(Continued)

(56) References Cited

U.S. PATENT DOCUMENTS 7,734,419 B2 6/2010 Kondoh
2001/0012976 A1* 8/2001 Menig ................... B60K 35/00
701/1
(Continued)

FOREIGN PATENT DOCUMENTS

DE 10 2007 058 295 A1 6/2009
DE 10 2015 116 043 A1 3/2016
(Continued)

OTHER PUBLICATIONS

Nov. 29, 2017 Office Action issued in German Patent Application No. 10 2017 202 115.2.

*Primary Examiner* — Jeffery A Brier
(74) *Attorney, Agent, or Firm* — Oliff PLC (57) ABSTRACT

On the basis of information detected from a peripheral situation detecting section and information from an automatic driving support section, a display control section generates image data in which marks for driving support of an own vehicle are drawn so as to be superposed on a forward situation diagram that shows a situation at a front side. Further, from information detected by an eye detecting section and from the image data, the display control section sets a vanishing point in accordance with a height position of eyes and computes a display image. Moreover, on the basis of the information detected by the eye detecting section, the display control section causes a display image to be displayed on the front windshield glass by a HUD such that the vanishing point is set in accordance with the height position of the eyes.

8 Claims, 7 Drawing Sheets

(51) Int. Cl.
*G06T 11/60* (2006.01)
*G02B 27/00* (2006.01)

(52) U.S. Cl.
CPC ..... *G02B 27/0101* (2013.01); *G02B 27/0149* (2013.01); *G06T 11/60* (2013.01); *B60K 2350/1084* (2013.01); *B60K 2350/2052* (2013.01); *B60K 2350/2056* (2013.01); *B60K 2350/352* (2013.01); *B60K 2700/00* (2013.01); *G02B 2027/014* (2013.01); *G02B 2027/0141* (2013.01); *G02B 2027/0159* (2013.01); *G02B 2027/0163* (2013.01); *G02B 2027/0187* (2013.01)

(58) Field of Classification Search
CPC .... G02B 2027/0185; G02B 2027/0187; G06T 19/006; G06T 11/60; B60K 2350/1084
See application file for complete search history.

(56) References Cited

U.S. PATENT DOCUMENTS

| | | | |
|---|---|---|---|
| 2005/0007261 A1* | 1/2005 | Berson | G01C 23/00 340/945 |
| 2010/0253493 A1* | 10/2010 | Szczerba | G01S 13/723 340/435 |
| 2010/0253595 A1* | 10/2010 | Szczerba | G01C 21/365 345/7 |
| 2012/0170130 A1 | 7/2012 | Sasaki et al. | |
| 2012/0224062 A1* | 9/2012 | Lacoste | G01C 21/365 348/148 |
| 2012/0259546 A1 | 10/2012 | Kim | |
| 2013/0300911 A1* | 11/2013 | Beckman | G02B 27/0101 348/335 |
| 2014/0092134 A1* | 4/2014 | Nagasawa | B60K 35/00 345/633 |
| 2015/0331236 A1 | 11/2015 | Roth et al. | |
| 2016/0090041 A1 | 3/2016 | Nagasawa et al. | |
| 2016/0167514 A1* | 6/2016 | Nishizaki | G09G 3/025 345/7 |
| 2016/0320624 A1 | 11/2016 | Yamaoka | |
| 2017/0106750 A1 | 4/2017 | Tauchi et al. | |
| 2017/0169612 A1* | 6/2017 | Cashen | G06T 19/006 |

FOREIGN PATENT DOCUMENTS

| | | |
|---|---|---|
| DE | 10 2014 220 324 A1 | 6/2016 |
| DE | 11 2015 001 543 T5 | 12/2016 |
| DE | 11 2015 002 481 T5 | 2/2017 |
| JP | H06-195595 A | 7/1994 |
| JP | H09-35177 A | 2/1997 |
| JP | 2000-242898 A | 9/2000 |
| JP | 2005247224 A * | 9/2005 |
| JP | 2010-002341 A | 1/2010 |
| JP | 2013-056633 A | 3/2013 |
| JP | 2013-203103 A | 10/2013 |
| JP | 2014-010800 A | 1/2014 |
| JP | 2014-210537 A | 11/2014 |
| JP | 2015-104930 A | 6/2015 |
| WO | WO-2015151500 A1 * | 10/2015 |
| WO | WO-2015182026 A1 * | 12/2015 |

* cited by examiner

ON-VEHICLE DEVICE, METHOD OF CONTROLLING ON-VEHICLE DEVICE, AND COMPUTER-READABLE STORAGE MEDIUM

CROSS-REFERENCE TO RELATED APPLICATION

This application is based on and claims priority under 35 USC 119 from Japanese Patent Application No. 2016-028269 filed on Feb. 17, 2016, the disclosure of which is incorporated by reference herein.

BACKGROUND

Technical Field

The present invention relates to an on-vehicle device, a method of controlling an on-vehicle device, and a computer-readable storage medium.

Related Art

Techniques that support the driving of a vehicle are known (refer to Patent Document 1 (Japanese Patent Application Laid-Open (JP-A) No. 2014-10800), Patent Document 2 (JP-A No. 2015-104930), and Patent Document 3 (JP-A No. 9-35177)). For example, Patent Document 1 discloses a technique of displaying a preceding marker, that guides the advancing direction of an own vehicle, so as to be superposed on the scene of a real space by using a head-up display.

However, with the aforementioned prior art, there are cases in which it is difficult for the driver to intuitively understand the contents that are displayed on the front windshield glass, and there is room for improvement with regard to this point.

SUMMARY

In view of the above-described circumstances, an object of the present invention is to provide an on-vehicle device, a method of controlling an on-vehicle device, and a control program of an on-vehicle device that can make a driver intuitively understand contents that are displayed on a front windshield glass.

An on-vehicle device relating to a first aspect has: a peripheral situation detecting section that detects a situation of a periphery of an own vehicle; a driving support section that, by controlling the own vehicle on the basis of the situation of the periphery of the own vehicle that was detected by the peripheral situation detecting section, supports driving of the own vehicle by a driver; a display section that is able to display an image, on a front windshield glass of the own vehicle, in a manner of being superposed on a scene of a real space at a vehicle front side of the own vehicle; an eye detecting section that detects a height position of eyes of the driver of the own vehicle; and a display control section that, on the basis of information detected by the peripheral situation detecting section and information from the driving support section, generates image data in which marks for driving support of the own vehicle are drawn so as to be superposed on a forward situation diagram that shows the situation at a front side of the own vehicle, and that, from information detected by the eye detecting section and from the image data, sets a vanishing point in accordance with the height position of the eyes of the driver and computes a display image depicted by a one-point perspective drawing method, and, on the basis of the information detected by the eye detecting section, causes the display image to be displayed on the front windshield glass by the display section such that the vanishing point is set in accordance with the height position of the eyes of the driver.

In accordance with the above-described structure, on the basis of the information detected by the peripheral situation detecting section and the information from the driving support section, the display control section generates image data in which marks for driving support of the own vehicle are drawn so as to be superposed on a forward situation diagram that shows the situation at the front side of the own vehicle. The "shows the situation at the front side of the own vehicle" means showing the positional situation of, for example, other vehicles, the road (including the vehicle lanes), pedestrians, objects such as obstacles and the like, or the like that are at the front side of the own vehicle. Further, from the information detected by the eye detecting section and from the image data, the display control section sets a vanishing point in accordance with the height position of the eyes of the driver and computes a display image that is depicted by a one-point perspective drawing method. Moreover, on the basis of the information detected by the eye detecting section, the display control section causes the display image to be displayed on the front windshield glass by the display section, such that the vanishing point is set in accordance with the height position of the eyes of the driver. Displaying the display image such that the vanishing point is set in accordance with the height position of the eyes of the driver is in order to make it seem that the marks are displayed in accordance with the scene of the real space at the vehicle front side of the own vehicle. Due thereto, it appears to the driver that the marks are directly drawn on the scene of the real space at the vehicle front side of the own vehicle, and therefore, the driver can be made to intuitively understand the contents shown by the marks. For reference, the one-point perspective drawing method is one type of perspective, and is a drawing method in which one vanishing point is set in the composition at a position corresponding to the height of the eyes of the observer. In this one-point perspective drawing method, all of the lines in the depth direction are in a radial form so as to converge at the vanishing point.

In an on-vehicle device relating to a second aspect, in the first aspect, the marks include a first mark, that is shaped as an arrow and shows a traveling direction of another vehicle detected by the peripheral situation detecting section, and a second mark, that is shaped as an arrow and shows a planned traveling direction of the own vehicle.

In accordance with the above-described structure, the first mark, that is shaped as an arrow and shows the traveling direction of another vehicle detected by the peripheral situation detecting section, and the second mark, that is shaped as an arrow and that shows the planned traveling direction of the own vehicle, appear to be drawn directly on the scene of the real space at the vehicle front side of the own vehicle. Therefore, the driver can be made to intuitively understand the traveling direction of the other vehicle and the planned traveling direction of the own vehicle.

In an on-vehicle device relating to a third aspect, in the first or second aspect, the display section is built-in in an inner side of an instrument panel of the own vehicle, and has a concave mirror that reflects the display image toward the front windshield glass, and a mirror surface angle adjusting section that adjusts an angle of a reflecting surface of the concave mirror by operation of a motor, and the motor is controlled by the display control section.

In accordance with the above-described structure, the display image is reflected and enlarged by the concave mirror onto the front windshield glass, and the angle of the reflecting surface of the concave mirror is adjusted due to the motor of the mirror surface angle adjusting section operating. Due to the motor being controlled by the display control section, the display image is displayed on the front windshield glass such that the vanishing point is set in accordance with the height position of the eyes of the driver. Accordingly, the vanishing point of the display image can be made to correspond to the height position of the eyes of the driver by a relatively simple structure.

A method of controlling an on-vehicle device relating to a fourth aspect is a method of controlling an on-vehicle device that has: a peripheral situation detecting section that detects a situation of a periphery of an own vehicle; a driving support section that, by controlling the own vehicle on the basis of the situation of the periphery of the own vehicle that was detected by the peripheral situation detecting section, supports driving of the own vehicle by a driver; a display section that is able to display an image, on a front windshield glass of the own vehicle, in a manner of being superposed on a scene of a real space at a vehicle front side of the own vehicle; and an eye detecting section that detects a height position of eyes of the driver of the own vehicle, the method including: on the basis of information detected by the peripheral situation detecting section and information from the driving support section, generating image data in which marks for driving support of the own vehicle are drawn so as to be superposed on a forward situation diagram that shows the situation at a front side of the own vehicle, and, from information detected by the eye detecting section and from the image data, setting a vanishing point in accordance with the height position of the eyes of the driver and computing a display image depicted by a one-point perspective drawing method, and, on the basis of the information detected by the eye detecting section, causes the display image to be displayed on the front windshield glass by the display section such that the vanishing point is set in accordance with the height position of the eyes of the driver. Therefore, in the same way as in the first aspect, the driver can be made to intuitively understand the contents expressed by the marks.

A computer-readable storage medium storing a control program of an on-vehicle device relating to a fifth aspect stores a control program of an on-vehicle device that has: a peripheral situation detecting section that detects a situation of a periphery of an own vehicle; a driving support section that, by controlling the own vehicle on the basis of the situation of the periphery of the own vehicle that was detected by the peripheral situation detecting section, supports driving of the own vehicle by a driver; a display section that is able to display an image, on a front windshield glass of the own vehicle, in a manner of being superposed on a scene of a real space at a vehicle front side of the own vehicle; and an eye detecting section that detects a height position of eyes of the driver of the own vehicle, the control program causing a computer that is included in the on-vehicle device to execute processings including: on the basis of information detected by the peripheral situation detecting section and information from the driving support section, generating image data in which marks for driving support of the own vehicle are drawn so as to be superposed on a forward situation diagram that shows the situation at a front side of the own vehicle, and, from information detected by the eye detecting section and from the image data, setting a vanishing point in accordance with the height position of the eyes of the driver and computing a display image depicted by a one-point perspective drawing method, and, on the basis of the information detected by the eye detecting section, causing the display image to be displayed on the front windshield glass by the display section such that the vanishing point is set in accordance with the height position of the eyes of the driver. Therefore, due to a computer executing the control program of an on-vehicle device relating to the fifth aspect, the method of controlling an on-vehicle device relating to the fifth aspect is executed by the computer, and, in the same way as in the first and fourth aspects, the driver can be made to intuitively understand the contents expressed by the marks.

As described above, the present invention has the excellent effect of being able to make a driver intuitively understand contents that are displayed on a front windshield glass.

DETAILED DESCRIPTION

Figure 1:
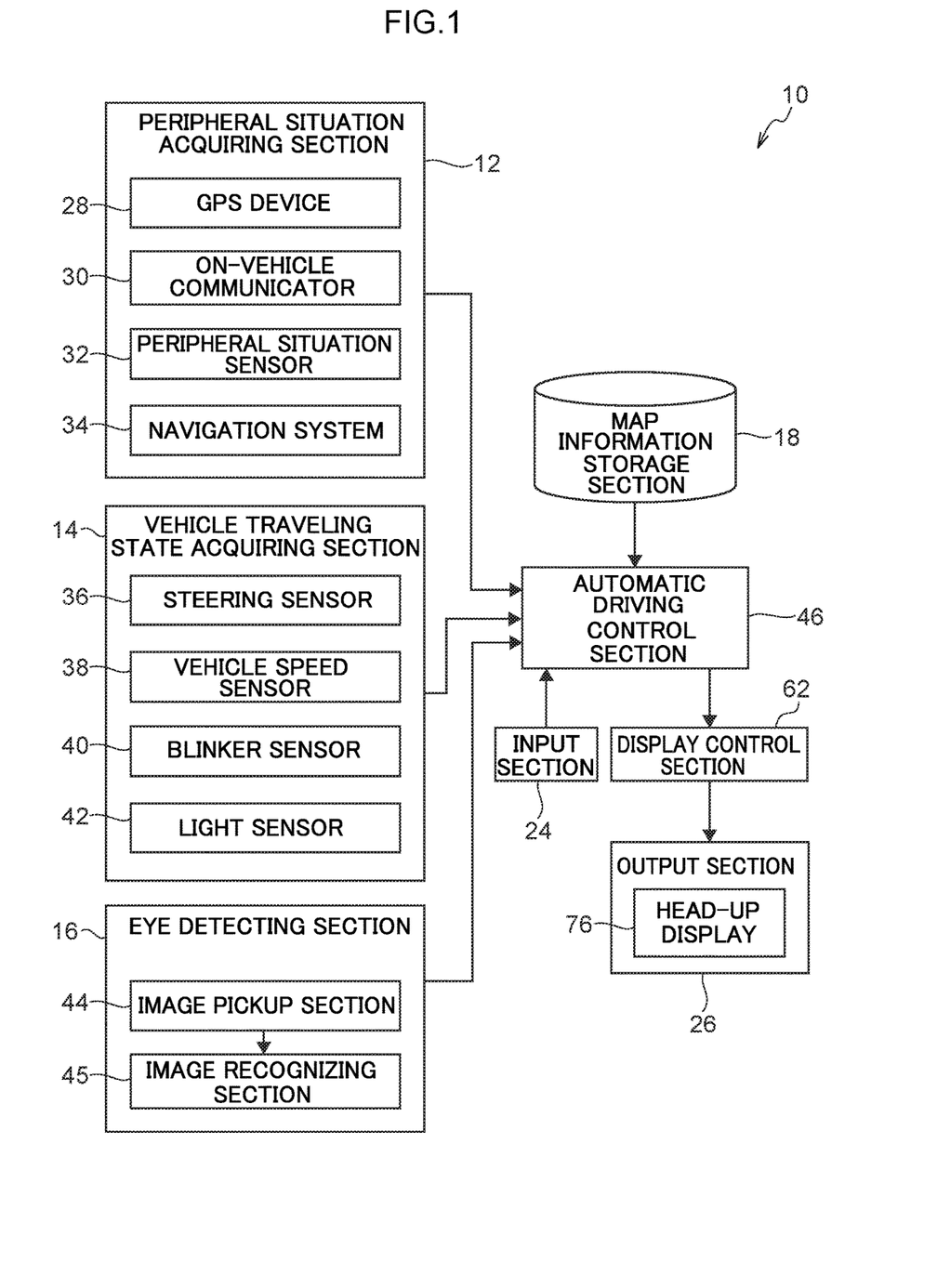
FIG. 1 is a block diagram showing the schematic structure of an automatic driving control device that serves as an example of an on-vehicle device relating to an embodiment of the present invention.

An on-vehicle device, a method of controlling an on-vehicle device, and a control program of an on-vehicle device relating to an embodiment of the present invention are described by using FIG. 1 through FIG. 7. A block diagram showing the schematic structure of an automatic driving control device 10 of the present embodiment is shown in FIG. 1. Note that the automatic driving control device 10 is an example of the on-vehicle device relating to the present invention.

The automatic driving control device 10 is a device that is installed in a vehicle (an own vehicle) and carries out automatic driving control processing as a driving support processing that supports the driving of a vehicle by a driver. The automatic driving control processing is a driving support processing that causes the vehicle in which the automatic driving control device 10 is installed (the own vehicle) to travel automatically without involving driving operation by a driver. As shown in FIG. 1, the automatic driving control device 10 is structured to include a peripheral situation acquiring section 12, a vehicle traveling state acquiring section 14, an eye detecting section 16, a map information storing section 18, an automatic driving control section 46, a display control section 62, an input section 24 and an output section 26.

The peripheral situation acquiring section 12 is a functional section that acquires information that expresses what type of situation the peripheral environment of the own vehicle is. The peripheral situation acquiring section 12 is structured to include a GPS device 28, an on-vehicle communicator 30, a peripheral situation sensor 32 and a navigation system 34. The GPS (Global Positioning System) device 28 receives GPS signals from plural GPS satellites, and measures the position of (positions) the own vehicle. The accuracy of positioning of the GPS device 28 improves in accordance with an increase in the number of GPS signals that can be received. The on-vehicle communicator 30 is a communication device that detects the situation of the periphery of the own vehicle by carrying out at least one of inter-vehicle transmission with other vehicles and road-vehicle communication with roadside devices. The peripheral situation sensor 32 includes at least one of a milliwave radar and an ultrasonic sonar sensor, and detects the positions of vehicles, roads, signs, buildings, pedestrians, objects such as obstacles or the like, and the like, and detects the moving speeds of objects that are moving. On the basis of position information obtained from the GPS device 28 and map information, the navigation system 34 carries out processing that displays the position of the own vehicle on a map and processing that guides the driver along the route to the destination.

Note that the above description gives several concrete examples of sensors for recognizing what type of situation the peripheral environment of the own vehicle is, but various other types of sensors, such as an on-vehicle camera or the like for example, may be used as sensors that recognize the situation of the peripheral environment of the own vehicle. The peripheral situation acquiring section 12 is an example of the peripheral situation detecting section of the present invention, and is structured to include a functional section that detects the situation of the periphery of the own vehicle.

The vehicle traveling state acquiring section 14 is a functional section that acquires information expressing the traveling state and the operating state of the vehicle, and is structured to include a steering angle sensor 36, a vehicle speed sensor 38, a blinker sensor 40 and a light sensor 42. The steering angle sensor 36 is a sensor that detects the steering angle of the own vehicle, and the vehicle speed sensor 38 is a sensor that detects the traveling speed of the own vehicle. The blinker sensor 40 is a sensor that detects the indicated direction of a turn signal of the own vehicle, and the light sensor 42 is a sensor that detects the on/off state of the lights of the own vehicle. Note that, in addition to the above, for example, other sensors that detect at least one of the depressed amount of the brakes, the gear position, and the operated state of the wipers may be used as well.

The eye detecting section 16 is structured to include an image pickup section 44 that captures images of the vehicle cabin interior region including the driver who is seated in the driver's seat, and an image recognizing section 45 that recognizes the eyes of the driver from the images that are picked-up by the image pickup section 44. The eye detecting section 16 detects the height position of the eyes of the driver by image recognition. An in-vehicle camera that is set within the vehicle is used as the image pickup section 44. Note that, in addition to detecting the height position of the eyes of the driver, the eye detecting section 16 may detect, for example, movement of the eyeballs of the driver, or the like.

Figure 2A:
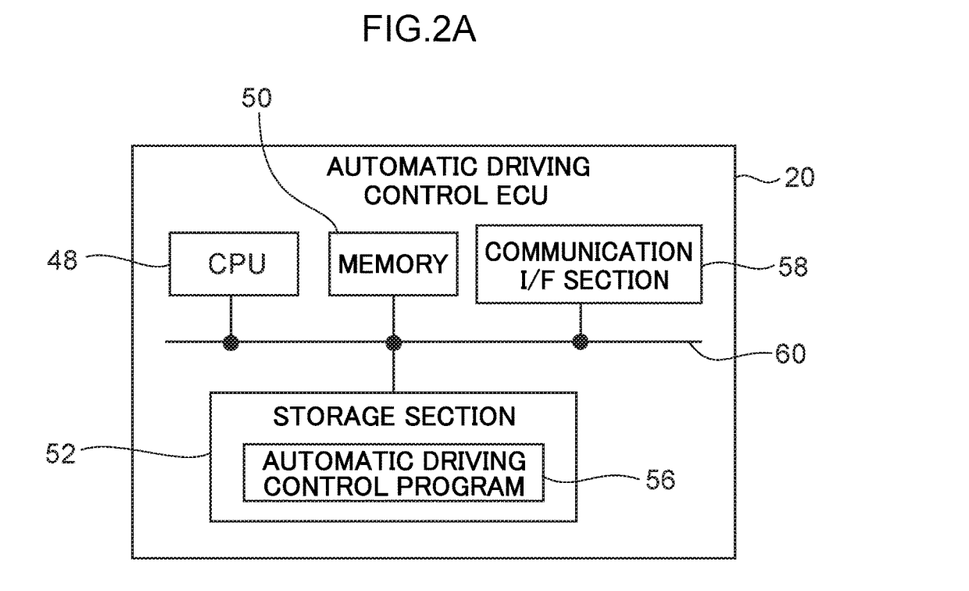
FIG. 2A is a block diagram showing the schematic structure of an automatic driving control ECU.

The automatic driving control section 46 carries out automatic driving control processing that makes the vehicle travel automatically by an automatic driving control ECU 20 that is shown in FIG. 2A. As shown in FIG. 2A, the automatic driving control ECU 20 has a CPU 48, a memory 50, a non-volatile storage section 52 and a communication interface (I/F) section 58, and these are connected to one another via a bus 60. The storage section 52 stores an automatic driving control program 56, and the communication interface (I/F) section 58 governs communications between the sensors and actuators and the like. The automatic driving control ECU 20 functions as the automatic driving control section 46 (see FIG. 1) due to the automatic driving control program 56 being read-out from the storage section 52 and expanded in the memory 50, and the automatic driving control program 56 that is expanded in the memory 50 being executed by the CPU 48.

As shown in FIG. 1, the peripheral situation acquiring section 12, the vehicle traveling state acquiring section 14, the eye detecting section 16, the map information storing section 18, the display control section 62 and the input section 24 are connected to the automatic driving control section 46. In order to make the vehicle travel automatically, the automatic driving control section 46 judges the situations of the own vehicle and the periphery thereof on the basis of the information obtained from the various types of sensors, and carries out automatic driving control processing that controls the acceleration amount, the braking amount, the steering angle, and the like. Namely, the automatic driving control section 46 is an example of the driving support section of the present invention, and supports the driving of the own vehicle by the driver by controlling the own vehicle on the basis of the situation of the periphery of the own vehicle that is detected by the peripheral situation acquiring section 12. Note that the automatic driving control processing by the automatic driving control section 46 is known in, for example, JP-A No. 2008-123197 and the like, and therefore, detailed description thereof is omitted.

The input section 24 is used at the time when the driver inputs information to the automatic driving control section 46, and includes at least one of a button, a switch and a touchscreen. The driver can input, via the input section 24 and to the automatic driving control section 46, instructions such as, for example, starting of automatic driving, ending of automatic driving, and the like.

Further, the output section 26 is connected to the display control section 62 that is connected to the automatic driving control section 46. The output section 26 includes a head-up display 76 (hereinafter called "HUD 76") for providing information from the automatic driving control section 46 to the driver.

Figure 3:
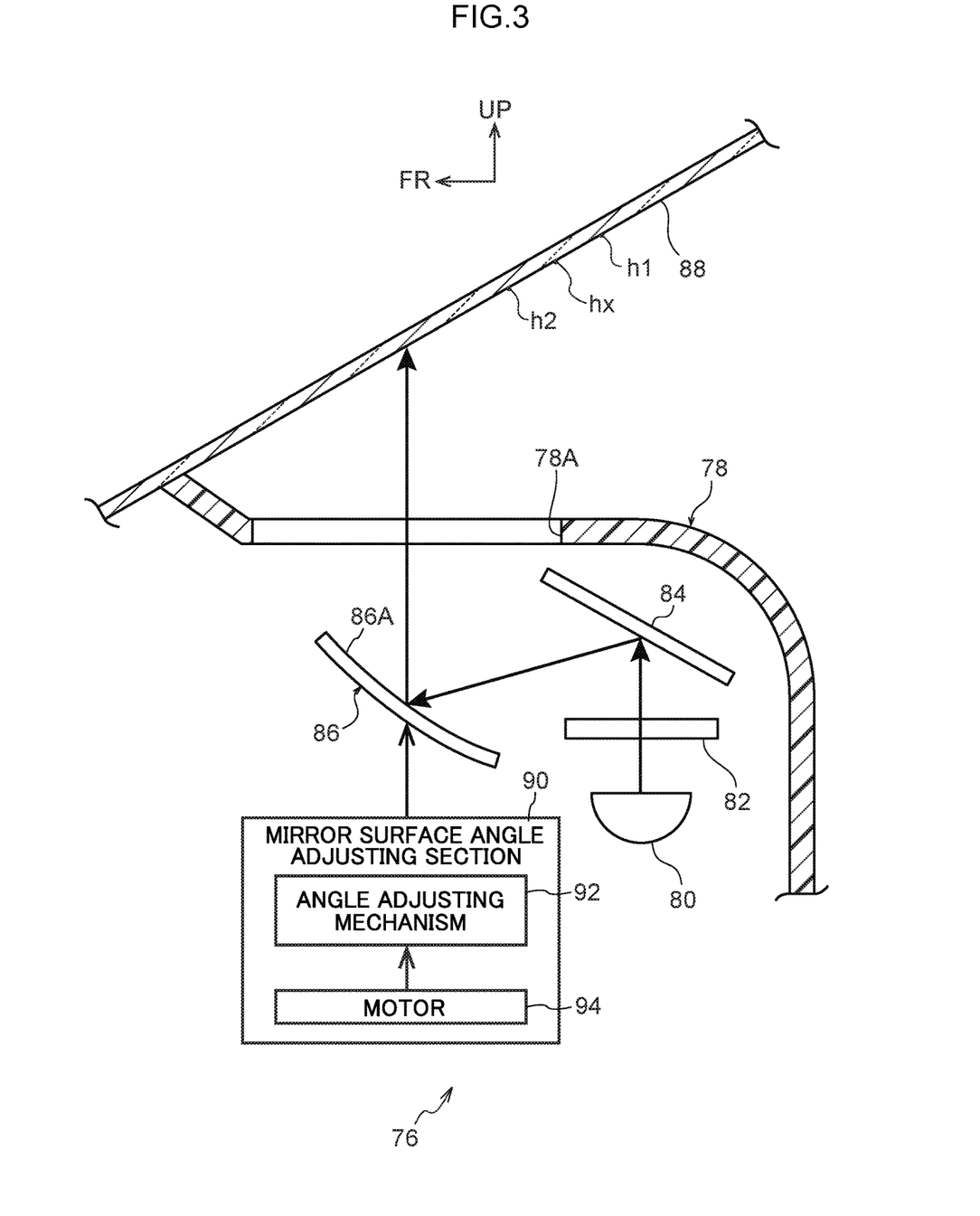
FIG. 3 is a schematic vertical sectional view showing the schematic structure of a head-up display (HUD) in a state of being viewed from a side of a vehicle.

A schematic vertical sectional view of a state in which the schematic structure of the HUD 76 is seen from a side of the vehicle is shown in FIG. 3. Note that, in FIG. 3, arrow FR indicates the vehicle forward side, and arrow UP indicates the vehicle upward side. As shown in FIG. 3, the HUD 76 is built-in the inner side of the instrument panel 78 of the own vehicle. The HUD 76 includes a light source 80, a liquid crystal panel 82 through which light emitted from the light source 80 is transmitted, a planar mirror 84 that reflects the light (the display image) transmitted through the liquid crystal panel 82, and a concave mirror 86 that reflects the light (the display image), that was reflected at the planar mirror 84, toward a front windshield glass 88 of the own vehicle. Moreover, the HUD 76 has a mirror surface angle adjusting section 90 that adjusts the angle of a reflecting surface 86A of the concave mirror 86 by the operation of a motor 94. Note that, in FIG. 3, the mirror surface angle adjusting section 90 is shown in the form of blocks. This mirror surface angle adjusting section 90 has an angle adjusting mechanism 92 that is provided at the concave mirror 86 and that adjusts the angle of the reflecting surface 86A of the concave mirror 86 by pivoting around an axis that runs along the vehicle transverse direction, and the motor 94 that drives the angle adjusting mechanism 92.

The HUD 76 is instructed of the image, that is to be projected and displayed onto the front windshield glass 88, from the display control section 62 (see FIG. 1) that is described in detail later, and controls the driving of the liquid crystal panel 82 in accordance with the instructed image. Then, the HUD 76 reflects the light, that has been transmitted through the liquid crystal panel 82, at the planar mirror 84 and the concave mirror 86, and causes the light, that is reflected by the concave mirror 86, to pass-through a through-hole 78A of the instrument panel 78, and illuminates the light onto the front windshield glass 88. Namely, the HUD 76 is a structure that projects, in an enlarged manner and onto the front windshield glass 88, the image instructed from the display control section 62 (see FIG. 1). Further, the motor 94 of the HUD 76 is controlled by the display control section 62 (see FIG. 1). The motor 94 adjusts the display range on the front windshield glass 88 up and down by operating in accordance with instructions from the display control section 62 (see FIG. 1) and adjusting the angle of the reflecting surface 86A of the concave mirror 86.

The upper limit position of the range of the display onto the front windshield glass 88 by using the HUD 76 can be adjusted between a first height position h1, that is higher than the height position of the eyes of an average driver, and a second height position h2, that is lower than the height position of the eyes of an average driver. Further, the angle of the reflecting surface 86A of the concave mirror 86 of the HUD 76 is set to be an angle that is such that, at least immediately before execution of the processing of displaying onto the front windshield glass 88 by using the HUD 76, the upper limit position of the range of the display onto the front windshield glass 88 becomes a standard height position hx that is set in advance between the first height position h1 and the second height position h2. Note that, in FIG. 3, the respective positions of the first height position h1, the second height position h2 and the standard height position hx are merely examples.

As described above, the HUD 76 can display an image onto the front windshield glass 88 of the vehicle with the image superposed on the scene of the real space at the vehicle front side of the own vehicle, and is an example of the display section of the present invention. Note that, instead of the structure of the HUD 76 that is shown in FIG. 3, a head-up display of another structure in which, for example, the number of or the arranged structure of the reflecting mirrors (planar mirrors and concave mirrors) or the like are changed.

Figure 2B:
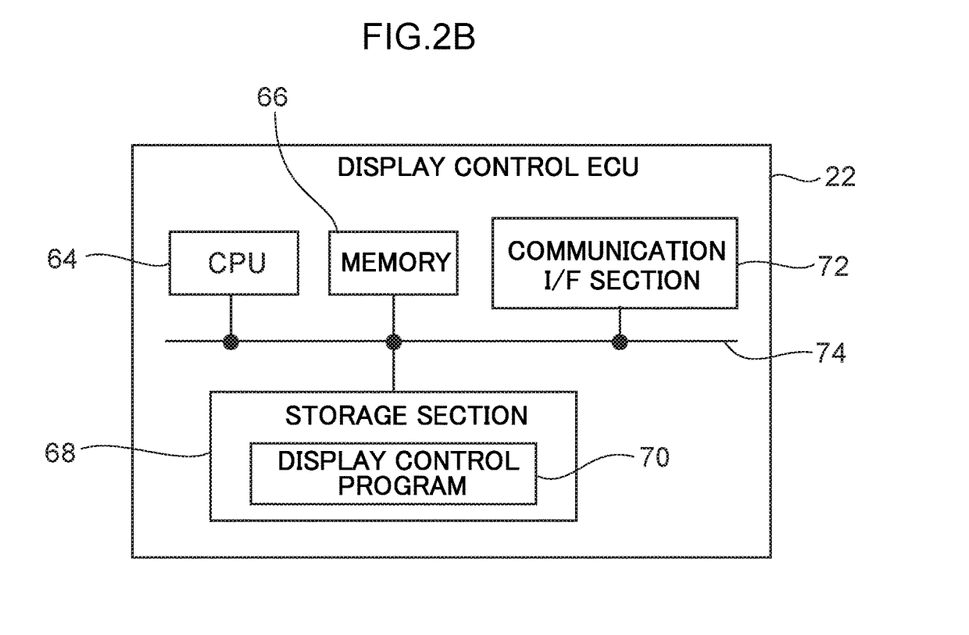
FIG. 2B is a block diagram showing the schematic structure of a display control ECU.

As shown in FIG. 1, the display control section 62 that is connected to the output section 26 controls the displaying of an image onto the HUD 76 by a display control ECU 22 (see FIG. 2). As shown in FIG. 2B, the display control ECU 22 has a CPU 64, a memory 66, a non-volatile storage section 68 and a communication interface (I/F) section 72, and these are connected to one another via a bus 74. The storage section 68 stores a display control program 70, and the communication interface (I/F) section 72 governs communications with the exterior. The display control ECU 22 functions as the display control section 62 (see FIG. 1) due to the display control program 70 being read-out from the storage section 68 and being expanded in the memory 66, and the display control program 70, that is expanded in the memory 66, being executed by the CPU 64.

Note that the display control program 70 is an example of the control program of the on-vehicle device relating to the present invention. Further, the display control ECU 22 is an example of the computer.

Figure 4:
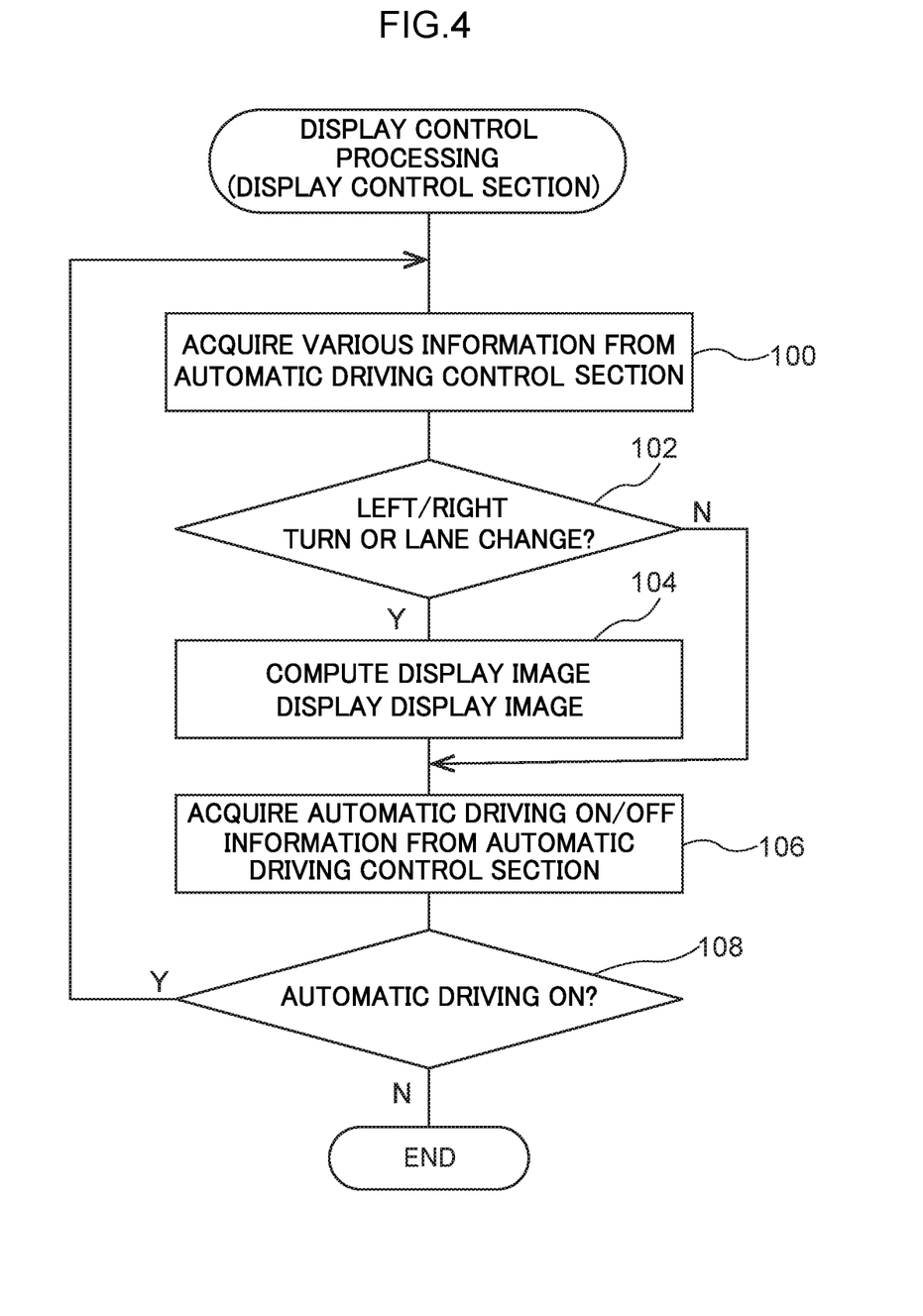
FIG. 4 is a flowchart showing the contents of display control processing.

Next, display control processing, that is executed by the display control section 62 (the display control ECU 22) of the vehicle in which the automatic driving control device 10 is installed, is described as operation of the present embodiment and with reference to the flowchart shown in FIG. 4. Note that, in the present embodiment, as an example, when an instruction to start automatic driving from the driver is inputted from the input section 24 to the automatic driving control section 46, the display control processing shown in FIG. 4 is executed, and this display control processing is executed continuously during automatic driving.

In step 100 of the display control processing shown in FIG. 4, the display control section 62 acquires, from the automatic driving control section 46, information that includes information that the automatic driving control section 46 has acquired from the peripheral situation acquiring section 12, the vehicle traveling state acquiring section 14 and the eye detecting section 16. Namely, the display control section 62 acquires, from the automatic driving control section 46, peripheral situation information that expresses the situation of the peripheral environment of the own vehicle, vehicle state information that expresses the traveling state and the operating state of the own vehicle, information of the height position of the eyes of the driver, information of the planned travel route of the own vehicle, and the like. Information, that relates to objects and the like that exist at the periphery of the own vehicle and that was detected by the peripheral situation sensor 32, is included in the peripheral situation information acquired in step 100.

In step 102 that follows step 100, on the basis of the information of the planned travel route of the own vehicle and the vehicle state information and the like that was acquired from the automatic driving control section 46 in previous step 100, the display control section 62 judges whether or not the own vehicle is turning left or right or is making a lane change (in other words, whether or not the own vehicle doing either of making a left or right turn or changing lanes). If the judgment in step 102 is negative, the routine moves on to step 106. If the judgment in step 102 is affirmative, the routine moves on to step 104.

In step 104, on the basis of the information detected by the peripheral situation acquiring section 12 and the eye detecting section 16 and the information from the automatic driving control section 46, the display control section 62 computes a display image, and causes this display image to be displayed by the HUD 76. More concretely, first, on the basis of the information detected by the peripheral situation acquiring section 12 and the information from the automatic driving control section 46, the display control section 62 generates image data in which marks for driving support of the own vehicle (designs for display such as symbols and figures and the like, or the like) are drawn so as to be superposed on a forward situation diagram that shows the situation at the front side of the own vehicle.

Figure 5:
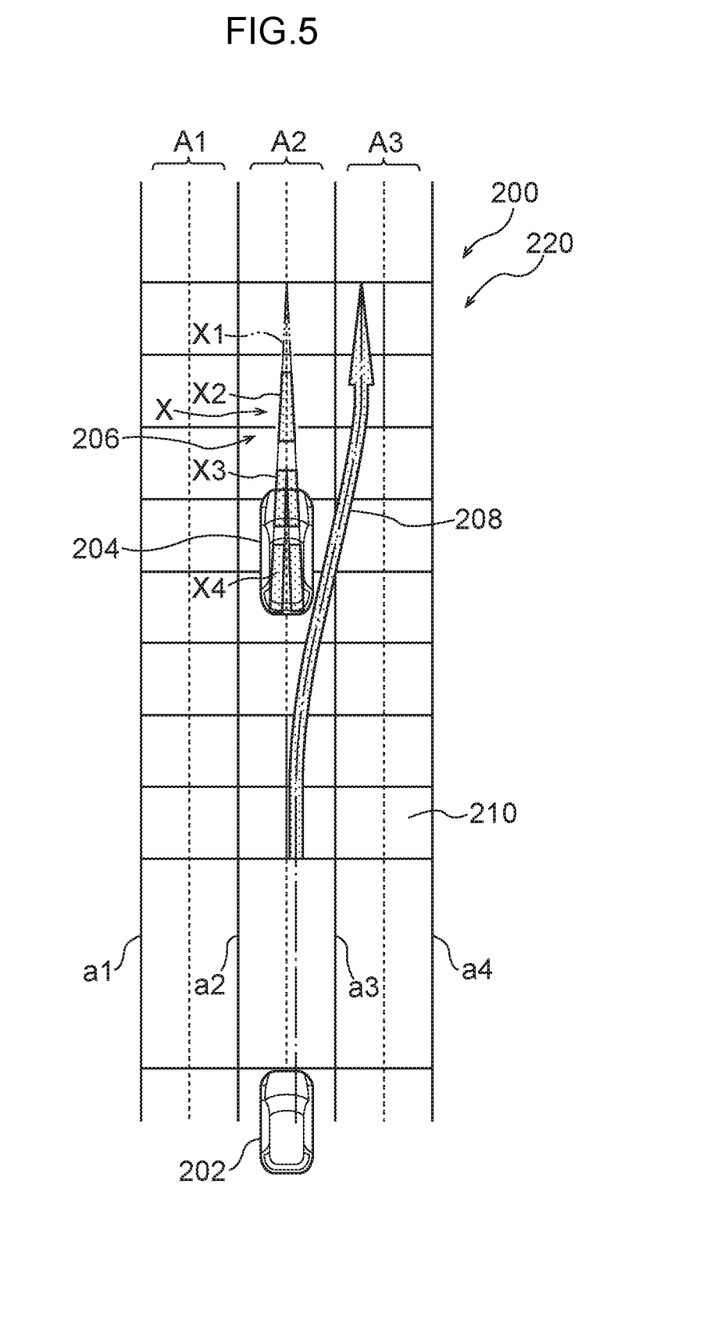
FIG. 5 is an image drawing showing an example of some of image data in which marks for driving support of an own vehicle are drawn so as to be superposed on a forward situation diagram that shows the situation at the front side of the own vehicle.

An example of some of image data 220, in which a first mark 206 and a second mark 208 that serve as marks for driving support of the own vehicle are drawn so as to be superposed on a forward situation diagram 200 that expresses the situation at the front side of the own vehicle, is shown in an image drawing in FIG. 5. Note that, in FIG. 5, illustration of portions that are further toward the vehicle front side than the upper side of the drawing is omitted. In FIG. 5, reference numeral 202 indicates the own vehicle, and reference number 204 indicates a preceding other vehicle (an element that can be interpreted in the broad sense as an obstacle that is ahead). Further, reference numeral A2 indicates the vehicle lane in which the own vehicle 202 is traveling, reference numeral A1 indicates the vehicle lane at the left side of the vehicle lane A2, and reference numeral A3 indicates the vehicle lane at the right side of the vehicle lane A2. Further, lines a1, a2, a3, a4 are the lines the divide the vehicle lanes.

As shown in FIG. 5, in the forward situation diagram 200, the first mark 206 and the second mark 208 are drawn so as to be superposed on a road 210. The first mark 206 is an arrow-shaped mark that shows the traveling direction of the other vehicle 204 that is detected by the peripheral situation acquiring section 12.

To describe the first mark 206 in further detail, the first mark 206 is such that, of an arrow-shaped mark X that is substantially upside-down V-shaped, distal end portion X1 (shown by the two-dot chain line) is set so as to not be displayed. Here, at the arrow-shaped mark X, the distal end portion X1 (shown by the two-dot chain line), a first intermediate portion X2, a second intermediate portion X3 and a near portion X4, that are respectively colored, are set so as to be spaced apart at an interval in that order. Further, in step 104, if, after the arrow-shaped mark X that is stored in advance in the storage section 68 is pasted on the road 210, it is judged that the inter-vehicle distance between the other vehicle 204 and the own vehicle 202 is smaller than a threshold value that is set in advance, the distal end portion X1 (shown by the two-dot chain line) is set so as to not be displayed, as shown in FIG. 5. On the other hand, if, after the arrow-shaped mark X is pasted on the road 210, it is judged that the inter-vehicle distance between the other vehicle 204 and the own vehicle 202 is greater than or equal to the threshold value that is set in advance, the distal end portion X1, the first intermediate portion X2 and the second intermediate portion X3 are displayed, and the near portion X4 is set so as to not be displayed (not illustrated).

Note that, in FIG. 5, because the other vehicle 204 is traveling straight, the first mark 206 also is a shape that has left-right symmetry. However, if the other vehicle 204 is traveling along a curve, an arrow-shaped mark that corresponds to that curve (i.e., that is bent) is drawn as the first mark (not illustrated).

The second mark 208 is an arrow-shaped mark that shows the planned traveling direction (the planned travel route) of the own vehicle 202, and, in FIG. 5, a case in which the own vehicle 202 changes lanes is shown as an example. Further, in the present embodiment, the second mark 208 is drawn by, for example, the second mark 208 that is stored in advance being pasted at a predetermined timing in step 104 (see FIG. 4). Note that, as a modified example, in step 104 (see FIG. 4), the second mark 208 may be drawn while being updated continuously in accordance with the passage of time.

The first mark 206 and the second mark 208 are drawn on the basis of information from the automatic driving control section 46. To further explain the point of pasting the arrow-shaped mark X and the second mark 208 that are stored in advance, arrow-shaped marks of, for example, several tens of patterns are stored in advance in the storage section 68, and the appropriate mark is selected from among these marks and is pasted. Note that the number of arrow-shaped marks that are stored in advance in the storage section 68 does not have to be several tens of patterns, and, for example, may be several hundreds of patterns or the like.

In step 104 of FIG. 4, the display control section 62 (the CPU 64) sets a vanishing point in accordance with the height position of the eyes of the driver, from the information of the height position of the eyes of the driver that was detected by the eye detecting section 16 (see FIG. 1) and from the image data 220 (see FIG. 5), and computes a display image that is depicted by a one-point perspective drawing method. Further, in the present embodiment, as an example, auxiliary information, such as speed information and the like, is written in a superposed manner in the display region of the display image. Further, on the basis of the information of the height position of the eyes of the driver that was detected by the eye detecting section 16, the display control section 62 causes the display image to be displayed on the front windshield glass 88 (see FIG. 3) by the HUD 76 such that the vanishing point is set in accordance with the height position of the eyes of the driver, and causes the auxiliary information to also be displayed on the front windshield glass 88 by the HUD 76. Note that the displaying of the display image such that the vanishing point is set in accordance with the height position of the eyes of the driver is in order for it to seem as if the marks are displayed in accordance with the scene of the real space at the vehicle front side of the own vehicle.

To describe this in further detail, at the HUD 76 shown in FIG. 3, the light that has been transmitted through the liquid crystal panel 82 is reflected by the planar mirror 84 and the concave mirror 86, and is transmitted through the through-hole 78A of the instrument panel 78, and is illuminated onto the front windshield glass 88. Due thereto, the display image and the like, that were instructed from the display control section 62 (see FIG. 1), are projected in an enlarged manner onto the front windshield glass 88. Here, the angle of the reflecting surface 86A of the concave mirror 86 is adjusted due to the motor 94 of the mirror surface angle adjusting section 90 operating. Further, due to the motor 94 being controlled by the display control section 62 (see FIG. 1), the display image is displayed on the front windshield glass 88 such that the vanishing point is set in accordance with the height position of the eyes of the driver. Accordingly, the vanishing point of the display image can be made to correspond to the height position of the eyes of the driver by a relatively simple structure. Note that, in the present embodiment, the vanishing point of the display image is set to be the upper limit position of the range of display onto the front windshield glass 88 by using the HUD 76.

Here, a method of setting a vanishing point that corresponds to the height position of the eyes of the driver is explained concretely. First, the height position of the eyes of the driver that is detected by the eye detecting section 16, and the standard height position hx at the upper limit position of the range of display onto the front windshield glass 88, are compared. Then, if the height position of the eyes of the driver detected by the eye detecting section 16, and the standard height position hx at the upper limit position of the display range, are the same, the motor 94 is not operated. On the other hand, if the height position of the eyes of the driver detected by the eye detecting section 16 is higher than the standard height position hx at the upper limit position of the display range, the motor 94 is rotated (rotated forward) by a number of rotations that corresponds to this difference, and the upper limit position of the display range that includes the vanishing point is raised, such that the upper limit position of the display range including the vanishing point corresponds to the height position of the eyes of the driver. Further, if the height position of the eyes of the driver detected by the eye detecting section 16 is lower than the standard height position hx at the upper limit position of the display range, the motor 94 is rotated (rotated reversely) by a number of rotations that corresponds to this difference, and the upper limit position of the display range that includes the vanishing point is lowered, such that the upper limit position of the display range including the vanishing point corresponds to the height position of the eyes of the driver.

Figure 6:
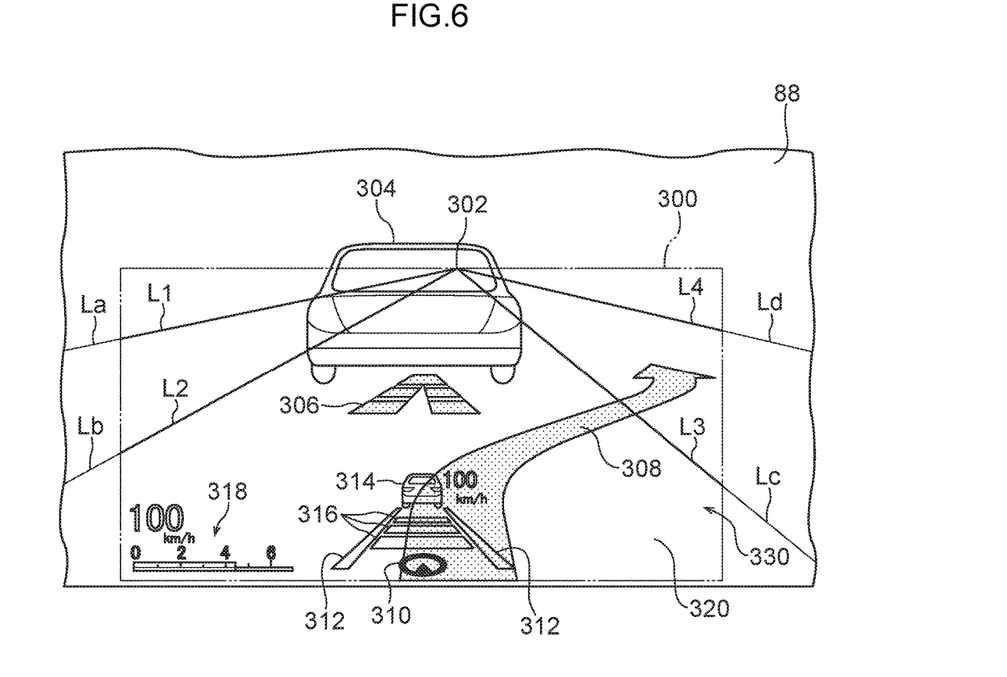
FIG. 6 is an image drawing showing a display example in which a display image, that is computed from the image data of FIG. 5 and the like, and auxiliary information are displayed on a front windshield glass.

FIG. 6 is an image drawing (a display example) in which a display image 330 (here, an image that displays marks 306, 308 and lines L1, L2, L3, L4), that is computed from the information detected by the eye detecting section 16 (see FIG. 1) and from the image data 220 (see FIG. 5), and auxiliary information are displayed on the front windshield glass 88. The range shown by the two-dot chain line in FIG. 6 is display range 300 that is displayed by the HUD 76. The upper limit position of the display range 300 is made to correspond to the height position of the eyes of the driver. Further, the lower limit position of the display range 300 is set along the lower end position of the front windshield glass 88.

In FIG. 6, point 302 is the vanishing point of the display image 330, and is made to correspond to the height position of the eyes of the driver. In FIG. 6, vehicle 304 is another vehicle (a preceding vehicle) in the scene of the real space at the vehicle front side of the own vehicle. Further, the lines L1, L2, L3, L4 are lines that partition the vehicle lanes in the display image 330, and these lines L1, L2, L3, L4 appear to be superposed on lines La, Lb, Lc, Ld that partition the vehicle lanes in the scene of the real space at the vehicle front side of the own vehicle. The mark 306 is a mark obtained by conversion of the first mark 206 (see FIG. 5), and the mark 308 is a mark that is obtained by conversion of the second mark 208 (see FIG. 5).

As shown in FIG. 6, the perspective sensations and the visual angles of the marks 306, 308 correspond to a road 320 and buildings or the like (not illustrated) at the periphery, and, to the driver, it appears as if the marks 306, 308 are drawn directly (without a perspective sensation) on the road 320 of the scene of the real space at the vehicle front side of the own vehicle. Accordingly, the driver can be made to intuitively understand the contents expressed by the marks 306, 308. Namely, in the present embodiment, the driver can be made to, intuitively and instantaneously and without relying on consideration or the like, understand the traveling direction of the other vehicle 304 and the planned traveling direction of the own vehicle.

Note that the auxiliary information is shown at the central portion of the lower side and at the left portion of the lower side of the display range 300. Mark 310 at the central portion of the lower side of the display range 300 indicates the position of the own vehicle in the auxiliary information display region, and lines 312 at the both sides of the mark 310 indicate the lines at the both sides of the vehicle lane. Namely, this shows that, here, the own vehicle is traveling within a vehicle lane. Further, mark 314 is a preceding vehicle (another vehicle) that is traveling in front of the own vehicle, and expresses that the automatic driving control device 10 recognizes the preceding vehicle. The speed display at the right side of the mark 314 is the speed display of the preceding vehicle. Further, plural lines 316 between the mark 310 and the mark 314 are information relating to the inter-vehicle distance between the own vehicle and the preceding vehicle, and show about how much of an inter-vehicle distance is being maintained while the driving support is being carried out. Moreover, a meter 318 at the left portion of the lower side of the display range 300 is a tachometer, and the speed display thereabove is the speed display of the own vehicle.

Figure 7A:
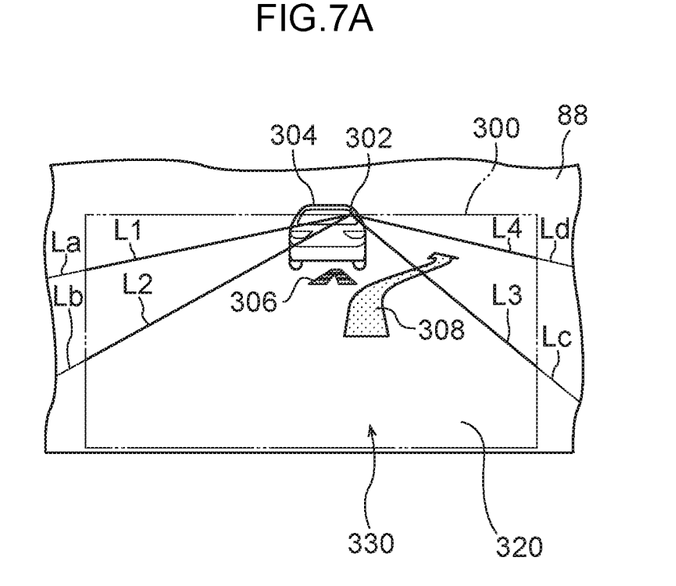
FIG. 7A shows a display example of a case in which another vehicle is further away than the case of FIG. 6.
Figure 7B:
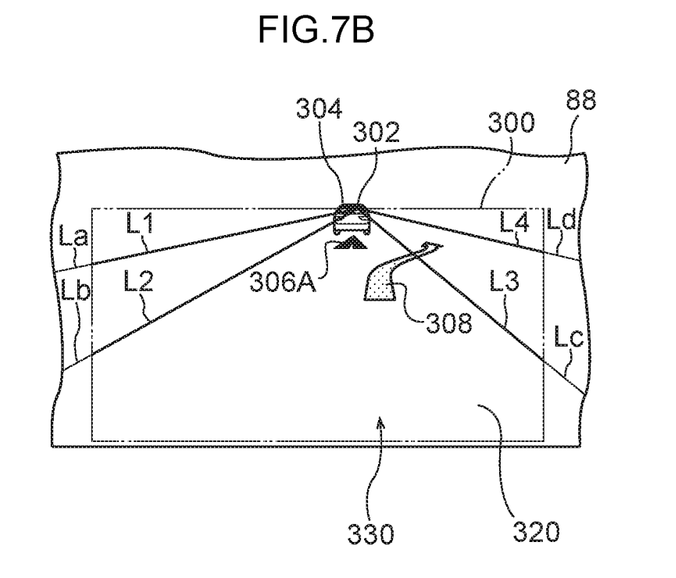
FIG. 7B shows a display example of a case in which another vehicle is even further away than the case of FIG. 7A.

Further, FIG. 7A is a display example of a case in which the other vehicle 304 is further away than the case of FIG. 6, and is a case in which the inter-vehicle distance between the own vehicle and the preceding other vehicle 304 is lower than a preset threshold value. On the other hand, FIG. 7B is a display example of a case in which the other vehicle 304 is even further away than the case of FIG. 7A, and is a case in which the inter-vehicle distance between the own vehicle and the preceding other vehicle 304 is greater than or equal to the preset threshold value. As shown in FIG. 7A and FIG. 7B, marks 306, 306A that show the traveling direction of the other vehicle 304, and the mark 308 that shows the planned traveling direction of the own vehicle, are displayed so as to be large when the other vehicle 304 is close, and are displayed so as to be small when the other vehicle 304 is far.

To further discuss the case of FIG. 7B which is the case in which the inter-vehicle distance between the own vehicle and the preceding other vehicle 304 is greater than or equal to the preset threshold value, at the time of generating the image data that corresponds to FIG. 5 and that is to be drawn in step 104 (see FIG. 4), the first mark (not illustrated) that is arrow-shaped and indicates the traveling direction of the other vehicle 204 is drawn by the arrow-shaped mark X being pasted on the road 210, and thereafter, the leading end portion X1, the first intermediate portion X2 and the second intermediate portion X3 being displayed, and the near portion X4 being set so as to not be displayed. Therefore, in FIG. 7B, the mark 306A that shows the traveling direction of the other vehicle 304 is displayed even smaller, and by this mark 306A as well, the driver can be made to intuitively understand that the preceding other vehicle 304 is far away.

As shown in FIG. 4, in next step 106, the display control section 62 acquires, from the automatic driving control section 46, information expressing whether or not the automatic driving control section 46 is currently carrying out the automatic driving control processing (i.e., the current on/off state of automatic driving). Then, in step 108, on the basis of the information acquired in step 106, the display control section 62 judges whether or not the current driving state is a state in which the automatic driving is on. If the judgment in step 108 is affirmative, the routine returns to step 100, and step 100 through step 108 are repeated until the judgment of step 108 is negative. When the judgment of step 108 is negative, the display control processing shown in FIG. 4 is ended. Note that, in the present embodiment, as an example, at the time of ending the display control processing shown in FIG. 4, the motor 94 shown in FIG. 3 is operated, and the angle of the reflecting surface 86A of the concave mirror 86 of the HUD 76 is returned to an angle that is such that the upper limit position of the range of display onto the front windshield glass 88 is the standard height position hx. However, the processing that returns the angle of the reflecting surface 86A of the concave mirror 86 of the HUD 76 may be carried out at another time, provided that it is before execution next time of the processing of displaying onto the front windshield glass 88 by using the HUD 76.

Note that, in the present embodiment, as an example, the display image is displayed only in a case in which the judgment of step 102 in FIG. 4 is affirmative. However, for example, the display image may be displayed without providing step 102.

As described above, in accordance with the present embodiment, the driver can be made to intuitively understand the contents displayed on the front windshield glass 88 shown in FIG. 6.

Note that, as a modified example of the above-described embodiment, the setting of the first mark that is drawn in the image data that corresponds to FIG. 5 does not have to be changed in accordance with the inter-vehicle distance between the other vehicle (204) and the own vehicle (202).

Further, as a modified example of the above-described embodiment, the auxiliary information such as the traveling speed and the like, that is displayed on the front windshield glass 88 and is shown in FIG. 6, may be displayed further toward the upper side than the height position of the eyes of the driver.

Further, in the above-described embodiment, the display range of the display image is adjusted by the mirror surface angle adjusting section 90 that is shown in FIG. 3, but the display range of the display image may be adjusted by another structure.

Further, the display control program 70 that is shown in FIG. 2B may be stored on a storage medium and the like and made to be able to be distributed.

Further, the above-described embodiment describes an aspect in which automatic driving control processing, that does not require driving operation by the driver, is carried out as the driving support processing that supports the driving of the own vehicle by the driver. However, the present invention is not limited to this, and can also be applied to an aspect in which processing, that assists the driving operation by the driver and that drives the vehicle in cooperation with the driver, is carried out as the driving support processing.

Note that the above-described embodiment and the above-described modified examples can be implemented by being combined appropriately.

Although an example of the present invention has been described above, the present invention is not limited to the above, and, other than the above, can, of course, be implemented by being modified in various ways within a scope that does not depart from the gist thereof.

What is claimed is:

1. An on-vehicle device comprising:
a peripheral situation detector that detects a situation of a periphery of an own vehicle;
a display that is able to display an image, on a front windshield glass of the own vehicle, in a manner of being superposed on a scene of a real space at a vehicle front side of the own vehicle;
an eye detector that detects a height position of eyes of a driver of the own vehicle; and
at least one processor programmed to:
support driving of the own vehicle by the driver by controlling the own vehicle based on the situation of the periphery of the own vehicle that was detected by the peripheral situation detector;
generate image data, in which marks for driving support of the own vehicle are drawn so as to be superposed on a forward situation diagram that shows a situation at a front side of the own vehicle, based on the detected situation of the periphery of the own vehicle and information obtained from supporting the driving of the own vehicle;
set a vanishing point in accordance with the height position of the eyes of the driver and compute a display image depicted by a one-point perspective drawing method from the detected height position of eyes of the driver and the generated image data;
cause the display image to be displayed on the front windshield glass by the display such that the vanishing point is set in accordance with the height position of the eyes of the driver based on the detected height position of the eyes of the driver,
wherein:
the marks include a first mark, that is shaped as an arrow and shows a traveling direction of an other vehicle in the detected situation of the periphery of the own vehicle, and a second mark, that is shaped as an arrow and shows a planned traveling direction of the own vehicle; and
the first mark includes, in order from a tip end of the arrow toward another end of the arrow, a distal end portion, a first intermediate portion, a second intermediate portion and a near portion;
in response to determining that an inter-vehicle distance between the other vehicle and the own vehicle is smaller than a threshold value that is set in advance;
display the first intermediate portion, the second intermediate portion and the near portion of the first mark; and
not display the distal end portion of the first mark; and
in response to determining that the inter-vehicle distance between the other vehicle and the own vehicle is greater than or equal to the threshold value;
display the distal end portion, the first intermediate portion and the second intermediate portion of the first mark; and
not display the near portion of the first mark.

2. The on-vehicle device of claim 1, wherein
the display is built-in in an inner side of an instrument panel of the own vehicle, and has a concave mirror that reflects the display image toward the front windshield glass, and a mirror surface angle adjustor that adjusts an angle of a reflecting surface of the concave mirror by operation of a motor, and
the motor is controlled by the at least one processor.

3. The on-vehicle device of claim 1, wherein
the first mark and the second mark appear to the driver to be drawn on a road of the scene of the real space at the vehicle front side of the own vehicle in the display image.

4. The on-vehicle device of claim 1, wherein
the second mark is drawn while being updated continuously in accordance with passage of time.

5. The on-vehicle device of claim 1, wherein
the display image include lines that partition vehicle lanes in the display image, and the lines appear to the driver to be superposed on lines that partition vehicle lanes in the scene of the real space at the vehicle front side of the own vehicle in the display image.

6. The on-vehicle device of claim 1, wherein
an upper limit position of the display image is made to correspond to the height position of the eyes of the driver, and a lower limit position of the display image is set along a lower end position of the front windshield glass.

7. A method of controlling an on-vehicle device that has;
a peripheral situation detector that detects a situation of a periphery of an own vehicle;
at least one processor programmed to support driving of the own vehicle by a driver by controlling the own vehicle based on the situation of the periphery of the own vehicle that was detected by the peripheral situation detector;
a display that is able to display an image, on a front windshield glass of the own vehicle, in a manner of being superposed on a scene of a real space at a vehicle front side of the own vehicle; and
an eye detector that detects a height position of eyes of the driver of the own vehicle,
the method comprising:
  generating image data, in which marks for driving support of the own vehicle are drawn so as to be superposed on a forward situation diagram that shows a situation at a front side of the own vehicle, based on the detected situation of the periphery of the own vehicle and information obtained from supporting the driving of the own vehicle;
  setting a vanishing point in accordance with the height position of the eyes of the driver and computing a display image depicted by a one-point perspective drawing method from the detected height position of eyes of the driver and the generated image data;
  causing the display image to be displayed on the front windshield glass by the display such that the vanishing point is set in accordance with the height position of the eyes of the driver based on the detected height position of the eyes of the driver, wherein:
    the marks include a first mark, that is shaped as an arrow and shows a traveling direction of an other vehicle in the detected situation of the periphery of the own vehicle, and a second mark, that is shaped as an arrow and shows a planned traveling direction of the own vehicle; and
    the first mark includes, in order from a tip end of the arrow toward another end of the arrow, a distal end portion, a first intermediate portion, a second intermediate portion and a near portion;
  in response to determining that an inter-vehicle distance between the other vehicle and the own vehicle is smaller than a threshold value that is set in advance;
    displaying the first intermediate portion, the second intermediate portion and the near portion of the first mark; and
    not displaying the distal end portion of the first mark; and
  in response to determining that the inter-vehicle distance between the other vehicle and the own vehicle is greater than or equal to the threshold value;
    displaying the distal end portion, the first intermediate portion and the second intermediate portion of the first mark; and
    not displaying the near portion of the first mark.

8. A non-transitory computer-readable storage medium storing a control program of an on-vehicle device that has:
a peripheral situation detector that detects a situation of a periphery of an own vehicle;
at least one processor programmed to support driving of the own vehicle by a driver by controlling the own vehicle based on the situation of the periphery of the own vehicle that was detected by the peripheral situation detector;
a display that is able to display an image, on a front windshield glass of the own vehicle, in a manner of being superposed on a scene of a real space at a vehicle front side of the own vehicle; and
an eye detector that detects a height position of eyes of the driver of the own vehicle,
the control program causing a computer with the at least one processor that is included in the on-vehicle device to execute processing comprising:
  generating image data, in which marks for driving support of the own vehicle are drawn so as to be superposed on a forward situation diagram that shows a situation at a front side of the own vehicle, based on the detected situation of the periphery of the own vehicle and information obtained from supporting the driving of the own vehicle;
  setting a vanishing point in accordance with the height position of the eyes of the driver and computing a display image depicted by a one-point perspective drawing method from the detected height position of eyes of the driver and the generated image data;
  causing the display image to be displayed on the front windshield glass by the display such that the vanishing point is set in accordance with the height position of the eyes of the driver based on the detected height position of the eyes of the driver, wherein:
    the marks include a first mark, that is shaped as an arrow and shows a traveling direction of an other vehicle in the detected situation of the periphery of the own vehicle, and a second mark, that is shaped as an arrow and shows a planned traveling direction of the own vehicle; and
    the first mark includes, in order from a tip end of the arrow toward another end of the arrow, a distal end portion, a first intermediate portion, a second intermediate portion and a near portion;
  in response to determining that an inter-vehicle distance between the other vehicle and the own vehicle is smaller than a threshold value that is set in advance;
    displaying the first intermediate portion, the second intermediate portion and the near portion of the first mark; and
    not displaying the distal end portion of the first mark; and
  in response to determining that the inter-vehicle distance between the other vehicle and the own vehicle is greater than or equal to the threshold value;
    displaying the distal end portion, the first intermediate portion and the second intermediate portion of the first mark; and
    not displaying the near portion of the first mark.

* * * * *